US012689224B2

(12) United States Patent
Morgan et al.

(10) Patent No.: US 12,689,224 B2
(45) Date of Patent: Jul. 21, 2026

(54) WIRELESS POWER ARCHITECTURE WITH SERIES-COUPLED POWER CONVERTERS

(71) Applicant: Cirrus Logic International Semiconductor Ltd., Edinburgh (GB)

(72) Inventors: Ross C. Morgan, Bathgate (GB); Ivan Perry, Penicuik (GB); Hasnain Akram, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 426 days.

(21) Appl. No.: 17/376,640

(22) Filed: Jul. 15, 2021

(65) Prior Publication Data

US 2022/0052546 A1 Feb. 17, 2022

Related U.S. Application Data

(60) Provisional application No. 63/159,110, filed on Mar. 10, 2021, provisional application No. 63/065,706, filed on Aug. 14, 2020.

(51) Int. Cl.
| | |
|---|---|
| *H02J 50/10* | (2016.01) |
| *H02J 7/02* | (2016.01) |
| *H02J 50/20* | (2016.01) |
| *H02J 50/12* | (2016.01) |
| *H02J 105/44* | (2026.01) |

(52) U.S. Cl.
CPC .............. *H02J 7/02* (2013.01); *H02J 50/10* (2016.02); *H02J 50/12* (2016.02); *H02J 2105/44* (2026.01); *H02J 2207/20* (2020.01)

(58) Field of Classification Search
CPC .... H02J 7/02; H02J 50/10; H02J 50/12; H02J 2207/20; H02J 2310/22; H04B 5/00; B60L 11/1831; B60L 11/1829

USPC ..................................................... 320/108, 109
See application file for complete search history.

(56) References Cited

U.S. PATENT DOCUMENTS

| | | | | | |
|---|---|---|---|---|---|
| 8,525,370 | B2 * | 9/2013 | Walley | ..................... | H04B 5/79 |
| | | | | | 307/104 |
| 8,655,524 | B2 * | 2/2014 | Ichikawa | ................ | B60L 58/20 |
| | | | | | 701/22 |
| 8,692,512 | B2 * | 4/2014 | Tanikawa | ................ | B60L 58/20 |
| | | | | | 320/109 |

(Continued)

FOREIGN PATENT DOCUMENTS

| | | | | | |
|---|---|---|---|---|---|
| EP | | 2988428 | B1 | 10/2018 | |
| JP | | 2014193029 | A | 10/2014 | |
| WO | WO-2022260871 | A1 * | 12/2022 | .......... | H02M 1/0058 |

OTHER PUBLICATIONS

Sciencing.com—Definition of a series circuit. (Year: 2020).*

(Continued)

*Primary Examiner* — Drew A Dunn
*Assistant Examiner* — Pamela J Jeppson
(74) *Attorney, Agent, or Firm* — Jackson Walker L.L.P.

(57) ABSTRACT

A system may include a wireless receiver module configured to receive electrical energy from a wireless transmission module, a first power converter electrically coupled to the wireless transmission module and configured to convert a charging voltage generated by the wireless transmission module into an intermediate voltage, and a second power converter configured to be electrically coupled between a battery and the first power converter and configured to convert the intermediate voltage into a battery voltage for charging the battery.

23 Claims, 1 Drawing Sheet

100

(56) References Cited

U.S. PATENT DOCUMENTS

| | | | | |
|---|---|---|---|---|
| 8,716,974 | B2* | 5/2014 | Sakoda | B60L 53/122 |
| | | | | 320/108 |
| 8,810,205 | B2* | 8/2014 | Ichikawa | B60L 53/122 |
| | | | | 320/108 |
| 8,860,363 | B2* | 10/2014 | Ang | B60L 1/02 |
| | | | | 320/132 |
| 8,884,464 | B2* | 11/2014 | Jayaraman | H02M 5/458 |
| | | | | 307/66 |
| 8,912,738 | B2* | 12/2014 | Mahlein | B60L 53/122 |
| | | | | 363/34 |
| 9,184,633 | B2* | 11/2015 | Obayashi | B60L 53/31 |
| 9,444,251 | B2* | 9/2016 | Woo | H02M 1/4208 |
| 9,509,231 | B2* | 11/2016 | Zhu | H02M 7/537 |
| 9,537,328 | B2* | 1/2017 | Kim | H02J 7/0014 |
| 9,590,444 | B2* | 3/2017 | Walley | H02J 50/10 |
| 9,682,671 | B2* | 6/2017 | Ferrel | B60R 16/033 |
| 9,774,259 | B1* | 9/2017 | Ikriannikov | H02M 3/1584 |
| 10,040,358 | B2* | 8/2018 | Elshaer | H02M 3/155 |
| 10,075,086 | B2* | 9/2018 | Madawala | H02M 3/33576 |
| 10,122,220 | B2* | 11/2018 | Sankar | H02J 50/60 |
| 10,457,155 | B2* | 10/2019 | Wu | B60L 58/22 |
| 10,784,707 | B2* | 9/2020 | Floresca | H02J 50/12 |
| 10,804,729 | B2* | 10/2020 | Park | H02J 50/80 |
| 10,855,118 | B2* | 12/2020 | Radchenko | H01F 27/2885 |
| 10,923,950 | B2* | 2/2021 | Liao | H04B 5/79 |
| 11,011,936 | B2* | 5/2021 | Costinett | H02M 1/083 |
| 11,018,533 | B2* | 5/2021 | Kanakasabai | B60L 53/122 |
| 11,139,671 | B2* | 10/2021 | Kim | H01F 27/2871 |
| 11,336,122 | B2* | 5/2022 | Hanabusa | H02J 7/00712 |
| 11,411,432 | B2* | 8/2022 | Lee | H02J 7/007192 |
| 11,557,920 | B2* | 1/2023 | Fan | H02J 7/00304 |
| 11,916,428 | B2* | 2/2024 | Peluso | H02J 7/36 |
| 11,973,483 | B2* | 4/2024 | Nielsen | H02M 1/126 |
| 2010/0277003 | A1* | 11/2010 | Von Novak | H02J 50/40 |
| | | | | 323/283 |
| 2011/0025125 | A1* | 2/2011 | Brabec | H02J 7/0071 |
| | | | | 307/9.1 |
| 2011/0187184 | A1* | 8/2011 | Ichikawa | B60L 55/00 |
| | | | | 307/10.1 |
| 2012/0043807 | A1* | 2/2012 | Ichikawa | B60L 53/126 |
| | | | | 307/9.1 |
| 2012/0068663 | A1* | 3/2012 | Tanikawa | B60L 53/14 |
| | | | | 320/109 |
| 2012/0187771 | A1* | 7/2012 | Kamata | H02J 50/80 |
| | | | | 307/104 |
| 2013/0113299 | A1* | 5/2013 | Von Novak | H02J 50/40 |
| | | | | 307/104 |
| 2013/0193751 | A1* | 8/2013 | Sugiyama | B60L 1/003 |
| | | | | 307/9.1 |
| 2014/0132212 | A1* | 5/2014 | Ichikawa | B60L 53/36 |
| | | | | 320/108 |
| 2015/0353035 | A1* | 12/2015 | Ferrel | B60L 1/00 |
| | | | | 307/9.1 |
| 2016/0043562 | A1* | 2/2016 | Lisi | H02J 50/12 |
| | | | | 307/104 |
| 2016/0052415 | A1* | 2/2016 | Bell | H02J 50/80 |
| | | | | 320/108 |
| 2016/0079809 | A1* | 3/2016 | Corum | H03H 7/40 |
| | | | | 307/104 |
| 2017/0117717 | A1* | 4/2017 | Pagano | H02J 50/10 |
| 2018/0041060 | A1* | 2/2018 | Walley | H02J 7/0045 |
| 2018/0115246 | A1* | 4/2018 | Azrai | G06F 1/26 |
| 2019/0058358 | A1* | 2/2019 | Bae | H02J 50/12 |
| 2019/0097450 | A1* | 3/2019 | Park | H02J 7/02 |
| 2019/0165665 | A1* | 5/2019 | Dai | H02M 3/33592 |
| 2019/0356149 | A1* | 11/2019 | Li | H02M 3/1582 |
| 2020/0099257 | A1* | 3/2020 | Qiu | H01M 10/46 |
| 2020/0336009 | A1* | 10/2020 | Abajian | H02J 50/10 |
| 2021/0110969 | A1* | 4/2021 | Radchenko | H01F 27/2885 |
| 2022/0069631 | A1* | 3/2022 | Choi | H04B 5/0081 |
| 2022/0072963 | A1* | 3/2022 | Minamii | H02J 7/02 |
| 2022/0085658 | A1* | 3/2022 | Shibanuma | H02J 50/40 |
| 2022/0118542 | A1* | 4/2022 | Wang | B23K 9/125 |

OTHER PUBLICATIONS

Wiktionary—Definition of series (Year: 2013).*
International Search Report and Written Opinion of the International Searching Authority, International Application No. PCT/US2021/041791, mailed Oct. 8, 2021.

* cited by examiner

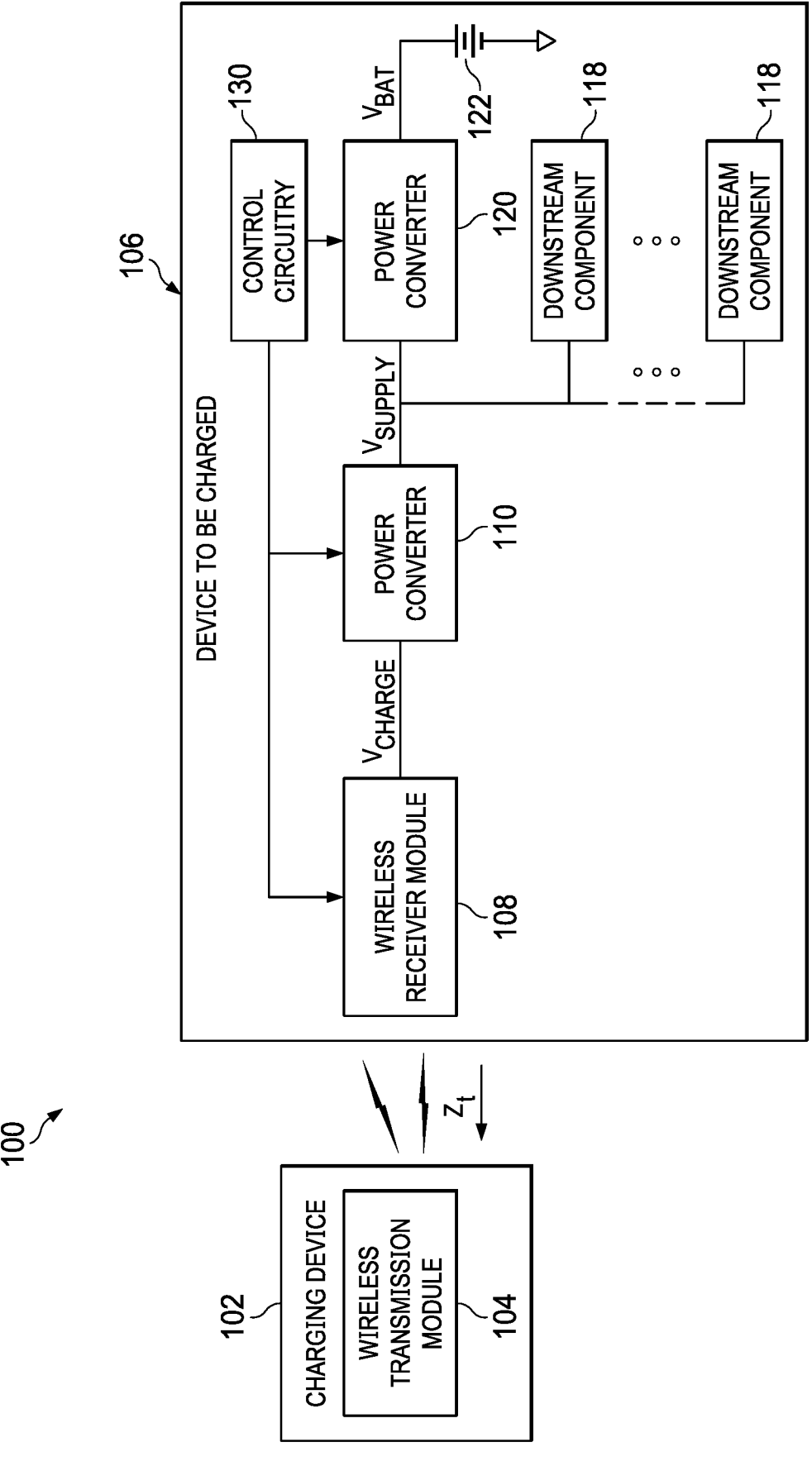

WIRELESS POWER ARCHITECTURE WITH SERIES-COUPLED POWER CONVERTERS

RELATED APPLICATION

The present disclosure claims priority to U.S. Provisional Patent Application Ser. No. 63/065,706, filed Aug. 14, 2020, and U.S. Provisional Patent Application Ser. No. 63/159,110, filed Mar. 10, 2021, both of which are incorporated by reference herein in their entireties.

FIELD OF DISCLOSURE

The present disclosure relates in general to circuits for electronic devices, including without limitation personal audio devices such as wireless telephones and media players, and more specifically, a power supply architecture with bidirectional battery idealization.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may include circuitry for wireless transmission of electrical energy from the portable electronic device to another device and/or wireless transmission of electrical energy to the portable electronic device from another device.

For example, a wireless transmission module may wirelessly transmit electrical energy from a charging device to a wireless receiver module provided on a device-to-be-charged. However, a load impedance of the device-to-be-charged may be low and may change due to changes over time in characteristics of a battery of the device-to-be-charged. In some instances, a wireless receiver module may be coupled with a power converter module to perform impedance matching with the wireless transmission module, which may improve wireless power transfer efficiency. However, such approach of impedance matching may require a narrow operating region and/or a relatively high duty cycle for the power converter in order to generate acceptable efficiency. Such problems may be exacerbated at high battery charge rates in which the load resistance is greatly reduced.

SUMMARY

In accordance with the teachings of the present disclosure, one or more disadvantages and problems associated with existing approaches to power supply architectures may be reduced or eliminated.

In accordance with embodiments of the present disclosure, a system may include a wireless receiver module configured to receive electrical energy from a wireless transmission module, a first power converter electrically coupled to the wireless transmission module and configured to convert a charging voltage generated by the wireless transmission module into an intermediate voltage, and a second power converter configured to be electrically coupled between a battery and the first power converter and configured to convert the intermediate voltage into a battery voltage for charging the battery.

In accordance with these and other embodiments of the present disclosure, a method may include receiving at a wireless receiver module electrical energy from a wireless transmission module, converting a charging voltage generated by the wireless transmission module into an intermediate voltage with a first power converter, and converting the intermediate voltage into a battery voltage for charging a battery with a second power converter electrically coupled between the battery and the first power converter.

In accordance with these and other embodiments of the present disclosure, an apparatus may be configured to receive electrical energy from a wireless transmission module, convert a charging voltage generated by the wireless transmission module into an intermediate voltage, and convert the intermediate voltage into a battery voltage for charging a battery.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWING

A more complete understanding of the present embodiments and advantages thereof may be acquired by referring to the following description taken in conjunction with the accompanying drawing, in which like reference numbers indicate like features, and wherein:

THE FIGURE illustrates an example wireless power system, in accordance with embodiments of the present disclosure.

DETAILED DESCRIPTION

THE FIGURE illustrates an example wireless power system 100, in accordance with embodiments of the present disclosure. As shown in THE FIGURE, wireless power system 100 may include a charging device 102 and a device-to-be-charged 106. In operation, as described in greater detail below, charging device 102 may be configured to wirelessly transmit electrical energy to device-to-be-charged 106, which may be used to power devices integral to device-to-be-charged 106 and/or charge one or more energy storage devices (e.g., batteries) integral to device-to-be-charged 106. For example, in some embodiments, when device-to-be-charged 106 is placed in proximity to charging device 102, inductive coupling between charging device 102 and device-to-be-charged 106 may enable transfer of electrical energy from charging device 102 to device-to-be-charged 106.

In some embodiments, charging device 102 may include an inductive charging mat and device-to-be-charged 106 may comprise a portable electronic device (e.g., a smart phone or tablet). In other embodiments, charging device 102 may comprise a portable electronic device (e.g., a smart phone or tablet) with wireless transmission ability and device-to-be-charged 106 may include an accessory device for such portable electronic device, such as wireless earbuds.

As shown in THE FIGURE, charging device 102 may include a wireless transmission module 104. Wireless transmission module 104 may comprise any system, device, or apparatus configured to wirelessly transmit electrical energy (e.g., via inductive coupling) to a corresponding wireless receiver module (e.g., wireless receiver module 108).

As also shown in the FIGURE, device-to-be-charged 106 may include a wireless receiver module 108, a power converter 110, a power converter 120, one or more downstream components 118, a battery 122, and control circuitry 130. As depicted, power converter 110 and power converter 120 may be arranged in series between wireless receiver module 108 and battery 122.

Wireless receiver module 108 may comprise any system, device, or apparatus configured to wirelessly receive electrical energy (e.g., via inductive coupling) from a corresponding wireless transmission module (e.g., wireless transmission module 104). Accordingly, wireless receiver module 108 may operate in practice as a battery charger to charge a battery (e.g., battery 122) for example by delivering electrical energy to a battery in order that such battery converts the electrical energy to chemical energy that is stored in such battery. In some embodiments, wireless receiver module 108 may comprise a receiver coil/antenna, a tuning network, a rectifier, and/or other components.

Power converter 110 may include any system, device, or apparatus configured to receive a charging voltage $V_{CHARGE}$ output by wireless receiver module 108 and convert such charging voltage $V_{CHARGE}$ into a supply voltage $V_{SUPPLY}$. In some embodiments, supply voltage $V_{SUPPLY}$ may be equal to or less than charger voltage $V_{CHARGE}$. In these and other embodiments, power converter 110 may comprise a capacitive power converter or "charge pump" (e.g., a switched-capacitor power converter operating at an N:1 input-to-output conversion ratio, where N is an integer greater than 1). In other embodiments, power converter 110 may comprise an inductor-based buck converter.

Power converter 120 may include any system, device, or apparatus configured to receive supply voltage $V_{SUPPLY}$ and convert supply voltage $V_{SUPPLY}$ into a battery voltage $V_{BAT}$ for charging battery 122. In some embodiments, battery voltage $V_{BAT}$ may be equal to or less than supply voltage $V_{SUPPLY}$. In these and other embodiments, power converter 120 may comprise an inductive buck converter (e.g., a switched-inductor power converter). In these and other embodiments, power converter 120 may also be configured to operate bidirectionally, to convert battery voltage $V_{BAT}$ generated by battery 122 into supply voltage $V_{SUPPLY}$. In some embodiments, power converter 120 may be lower in power efficiency than power converter 110, but may enable for finer tuning of power conversion than power converter 110.

Battery 122 may include any system, device, or apparatus configured to convert chemical energy stored within battery 122 to electrical energy for powering downstream components 118. Further, battery 122 may also be configured to recharge, in which it may convert electrical energy received by battery 122 into chemical energy to be stored for later conversion back into electrical energy. For example, in some embodiments, battery 122 may comprise a lithium-ion battery.

Downstream components 118 may include any suitable functional circuits or devices of device-to-be-charged 106, including without limitation processors, audio coder/decoders, amplifiers, display devices, audio transducers, etc. As shown in THE FIGURE, downstream components 118 may be powered from supply voltage $V_{SUPPLY}$ generated by either or both of power converter 110 and power converter 120.

Control circuitry 130 may include any system, device, or apparatus configured to control operation of power converter 110 and power converter 120 in order to generate desired levels of voltages for supply voltage $V_{SUPPLY}$ and/or battery voltage VBAT. For example, control circuitry 130 may commutate or otherwise control switches integral to power converter 110 and power converter 120 to regulate supply voltage $V_{SUPPLY}$ and/or battery voltage $V_{BAT}$ at desired levels.

As is evident from THE FIGURE, the electrical node of supply voltage $V_{SUPPLY}$ may exist between power converter 110 and power converter 120 and may serve as an output node for powering the system load of downstream components 118. Having such intermediate node between power converter 110 and power converter 120 may allow for such system load at supply voltage $V_{SUPPLY}$ to operate at a different voltage level than battery voltage $V_{BAT}$ and charging voltage $V_{CHARGE}$, through appropriate control by control circuitry 130. For example, such intermediate node may be operated at an elevated supply voltage $V_{SUPPLY}$ with respect to battery voltage $V_{BAT}$, and charging voltage $V_{CHARGE}$ may be operated at an elevated voltage with respect to supply voltage $V_{SUPPLY}$, which may result in an improved efficiency level as compared to existing approaches in which an output voltage of a wireless receiver module may be constrained by the voltage level of the system load and/or the battery.

Another advantage of the architecture depicted in THE FIGURE is that electrical energy may be delivered to downstream components 118 from wireless receiver module 108 using only power converter 110. As mentioned above, power converter 110 may be configured as a more power-efficient converter than power converter 120, thus providing an improved efficiency level for powering a system load directly from wireless receiver module 108.

Further, control circuitry 130 may be configured to control operation of power converter 110 and power converter 120 to ensure that a combined reflected impedance $Z_T$ of device-to-be-charged 106, as seen by wireless transmission module 104, is optimized for operating conditions of device-to-be-charged 106, in order to optimize efficiency of wireless power transfer from wireless transmission module 104 to wireless receiver module 108. Such combined reflected impedance $Z_T$ may comprise a combined impedance of wireless receiver module 108, power converter 110, power converter 120, battery 122, and downstream components 118. Accordingly, control circuitry 130 may be configured to monitor characteristics of battery 122 (e.g., battery impedance, battery state of charge) and control operation of power converter 110 and power converter 120. For example, with knowledge of the coupling coefficient between a transmitter coil/antenna of wireless transmission module 104 and a receiver coil/antenna of wireless receiver module 108 and an inverter frequency ω of an inverter of wireless transmission module 104, control circuitry 130 may attempt to generate an optimal combined reflected impedance $Z_T$ as follows:

$$Z_{T(opt)} = R_s \sqrt{1 + k^2 Q_p Q_s} - j\omega L_s$$

wherein $Q_p$ is a quality factor of wireless transmission module 104, $Q_s$ is a quality factor of wireless receiver module 108, $R_s$ is a resistance of wireless receiver module 108, $L_s$ is an inductance of receiver coil/antenna of wireless receiver module 108, and k is the coupling coefficient between a transmitter coil/antenna of wireless transmission module 104 and a receiver coil/antenna of wireless receiver module 108.

Another benefit of power converter 110 may be that it decouples supply voltage $V_{SUPPLY}$ from charger voltage $V_{CHARGE}$. For example, a maximum voltage level for supply voltage $V_{SUPPLY}$ may be limited because of requirements of downstream components 118. However, power converter 110 allows additional flexibility, by enabling freedom in modulating reflected impedance $Z_T$.

In some instances, control circuitry 130 may trade-off between the system operating voltage range and setting combined reflected impedance $Z_T$ at target optimal impedance $Z_{T(opt)}$. Further, those of skill in the art may recognize that wireless power system 100 may have a resonant frequency for power transmission from wireless transmission module 104 to wireless receiver module 108. In some embodiments, (e.g., where the inverter frequency ω is not equal to the resonant frequency for power transmission) the effect of the reactive nature of the rectifier load seen by wireless receiver module 108 may be known a-priori or a voltage and current phase difference for wireless receiver module 108 may be measured to determine the rectifier load impedance which may then be correctly accounted for in setting the combined reflected impedance $Z_T$. However, such target optimal impedance $Z_{T(opt)}$ may, in some embodiments, be determined using other approaches, for example by dynamically determining target optimal impedance $Z_{T(opt)}$ using a feedback loop, rather than mathematically.

Thus, in accordance with embodiments of this disclosure, control circuitry 130 may control operation of power converter 110 and power converter 120 to provide for improved power efficiency levels as compared to existing approaches, whether the efficiency of the wireless power transfer link between wireless transmission module 104 and wireless receiver module 108, and/or the efficiency of device-to-be-charged 106 when powering downstream components 118 from wireless receiver module 108. Because efficiency levels may be effectively controlled by device-to-be-charged 106, necessity of intelligent wall charger systems (Universal Serial Bus Programmable Power Supply systems) may be reduced or eliminated.

In some embodiments, in addition to control of power converter 110 and/or power converter 120, control circuitry 130 may control wireless receiver module 108 (e.g., control a rectifier integral to wireless receiver module 108), for example by controlling a duty cycle and/or phase of one or more switches of a rectifier integral to wireless receiver module 108, in order to control charging voltage $V_{CHARGE}$ and in turn controlling combined reflected impedance $Z_T$. Thus, in such embodiments, power converter 110 may comprise a rectifier of wireless receiver module 108.

In addition, while THE FIGURE depicts the use of two power converters (e.g., power converter 110 and power converter 120), in some embodiments, wireless power system 100 may include three or more cascaded power converters.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a wireless receiver module configured to receive electrical energy from a wireless transmission module;

a first power converter electrically coupled to the wireless receiver module and configured to convert a charging voltage generated by the wireless transmission module into an intermediate voltage;

a second power converter configured to be electrically coupled between a battery and the first power converter and configured to convert the intermediate voltage into a battery voltage for charging the battery, wherein the intermediate voltage is configured to power one or more components other than the battery, the first power converter, the second power converter, and the wireless receiver module, and wherein the one or more components are electrically coupled between the first power converter and the second power converter; and control circuitry configured to operate the first power converter and the second power converter to maintain a combined reflected impedance presented by the battery, the wireless receiver module, the first power converter, and the second power converter to the wireless transmission module at a desired level.

2. The system of claim 1, wherein the control circuitry is configured to control operation of the first power converter and the second power converter based on an impedance of the battery in order to maintain the combined reflected impedance at the desired level.

3. The system of claim 1, wherein the circuitry is configured to control operation of the first power converter and the second power converter based on inverter frequency of the wireless transmission module, a coupling factor between the wireless transmission module and the wireless receiver module, and a complex load of a rectifier integral to the wireless receiver module.

4. The system of claim 1, wherein:

the wireless receiver module comprises a rectifier; and the control circuitry is further configured to control operation of the rectifier in order to maintain the combined reflected impedance at the desired level.

5. The system of claim 1, wherein the first power converter comprises a rectifier of the wireless receiver module.

6. The system of claim 1, wherein the first power converter comprises a switched-capacitor power converter.

7. The system of claim 1, wherein the second power converter comprises an inductive buck converter.

8. The system of claim 1, wherein the second power converter is lower in power efficiency than the first power converter.

9. The system of claim 8, wherein the second power converter is enabled to provide for finer power tuning of power conversion than the first power converter.

10. The system of claim 1, wherein the second power converter is enabled to provide for finer power tuning of power conversion than the first power converter.

11. The system of claim 1, wherein the charging voltage is greater than the intermediate voltage and the intermediate voltage is greater than the battery voltage.

12. A method comprising:

receiving, at a wireless receiver module electrically coupled to a first power converter, electrical energy from a wireless transmission module;

converting a charging voltage generated by the wireless transmission module into an intermediate voltage with the first power converter;

converting the intermediate voltage into a battery voltage for charging a battery with a second power converter electrically coupled between the battery and the first power converter, wherein the intermediate voltage is configured to power one or more components other than the battery, the first power converter, the second power converter, and the wireless receiver module, and wherein the one or more components are electrically coupled between the first power converter and the second power converter; and operating the first power converter and the second power converter to maintain a combined reflected impedance presented by the battery, the wireless receiver module, the first power converter, and the second power converter to the wireless transmission module at a desired level.

13. The method of claim 12, further comprising controlling operation of the first power converter and the second power converter based on an impedance of the battery in order to maintain the combined reflected impedance at the desired level.

14. The method of claim 12, wherein the circuitry is configured to control operation of the first power converter and the second power converter based on inverter frequency of the wireless receiver module, a coupling factor between the wireless transmission module and the wireless receiver module, and a complex load of a rectifier integral to the wireless receiver module.

15. The method of claim 12, wherein:

the wireless receiver module comprises a rectifier; and the method further comprises controlling operation of the rectifier in order to maintain the combined reflected impedance at the desired level.

16. The method of claim 15, wherein the first power converter comprises a rectifier of the wireless receiver module.

17. The method of claim 12, wherein the first power converter comprises a switched-capacitor power converter.

18. The method of claim 12, wherein the second power converter comprises an inductive buck converter.

19. The method of claim 12, wherein the second power converter is lower in power efficiency than the first power converter.

20. The method of claim 19, wherein the second power converter is enabled to provide for finer power tuning of power conversion than the first power converter.

21. The method of claim 12, wherein the second power converter is enabled to provide for finer power tuning of power conversion than the first power converter.

22. The method of claim 12, wherein the charging voltage is greater than the intermediate voltage and the intermediate voltage is greater than the battery voltage.

23. An apparatus configured to:

receive, at a wireless receiver module electrically coupled to a first power converter, electrical energy from a wireless transmission module;

convert a charging voltage generated by the wireless transmission module into an intermediate voltage;

convert the intermediate voltage into a battery voltage for charging a battery, wherein two or more components other than the battery, the first power converter, the second power converter, and the wireless receiver module are electrically coupled between the first power converter and the second power converter, wherein each of the two or more components are in parallel with each other and each of the two or more components are in parallel with the second power converter, and wherein the intermediate voltage is configured to power the two or more components; and operate the first power converter and the second power converter to maintain a combined reflected impedance presented by the battery, the wireless receiver module, the first power converter, and the second power converter to the wireless transmission module at a desired level.

* * * * *